UNITED STATES PATENT OFFICE.

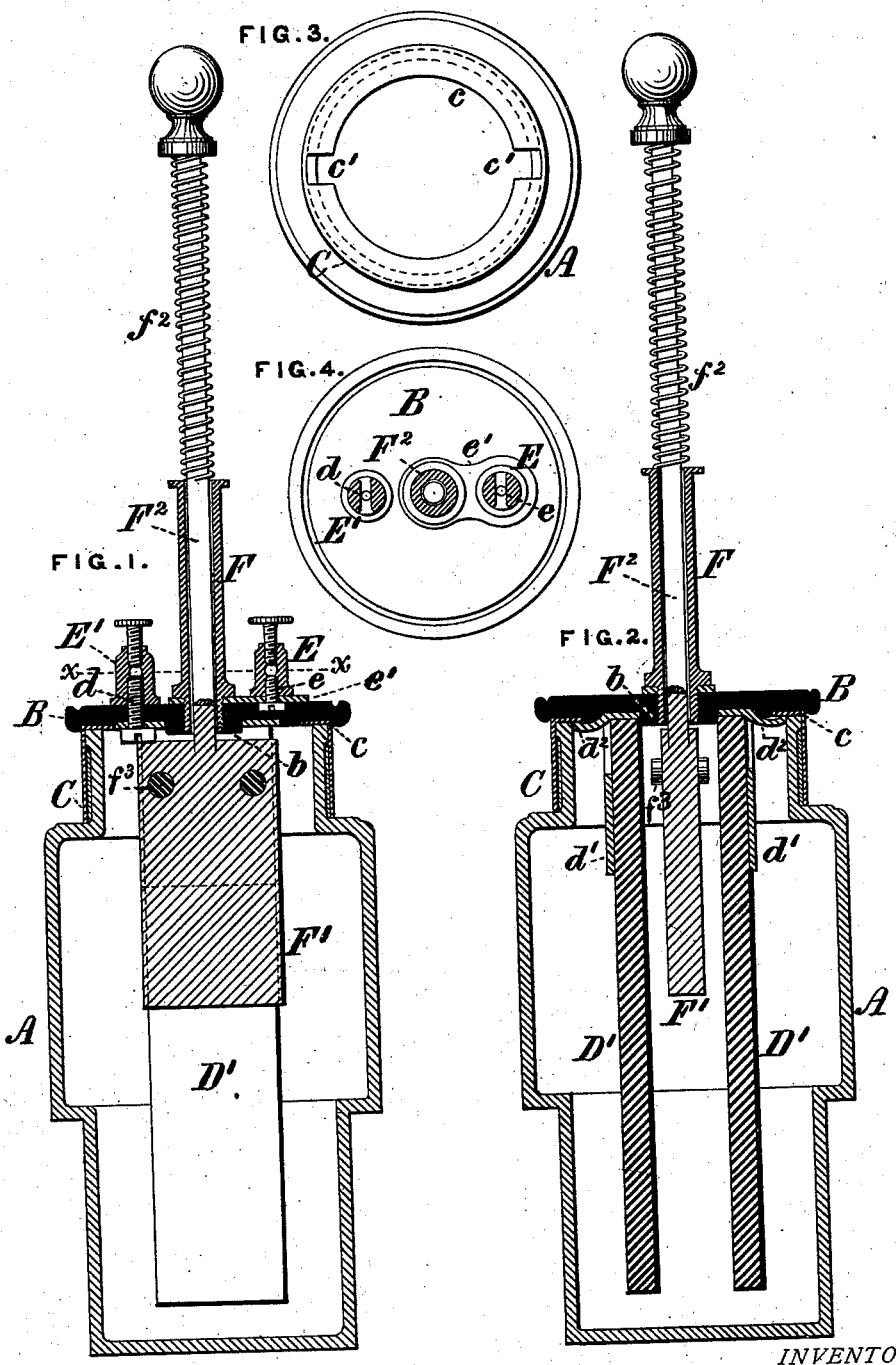

WILLIAM BOEKEL, OF PHILADELPHIA, PENNSYLVANIA.

IMPROVEMENT IN CAPS FOR BATTERY-CELLS.

Specification forming part of Letters Patent No. 203,405, dated May 7, 1878; application filed April 6, 1878.

*To all whom it may concern:*

Be it known that I, WILLIAM BOEKEL, of the city and county of Philadelphia, in the State of Pennsylvania, have invented certain new and useful Improvements in Galvanic Batteries, of which the following is a specification:

My improvements relate to batteries of the Grenet type, consisting of a cell containing a mixture of bichromate of potash and sulphuric acid, two stationary carbon plates, and a movable zinc plate, which may be immersed at will in the liquid to induce the electric current.

It is the object of my invention to provide simple and efficient means for connecting the zinc and carbon elements to the cap of the cell or bottle, so as to effectually prevent any direct electrical communication between them, and, correspondingly, to prevent weakening or interruption of the current. The improvements claimed are hereinafter fully set forth.

In the accompanying drawings, Figure 1 is a vertical central section of a battery embodying my improvements; Fig. 2, a similar section at right angles to Fig. 1; Fig. 3, a plan view of the cell and its collar, and Fig. 4 a plan section at the line $x\ x$ of Fig. 1.

In batteries of the class to which my improvements relate, as heretofore constructed, the imperfect insulation of the posts of the positive and negative wires entails, after a short period of use, the establishment of an electrical connection between them by the formation of a black deposit, due to the vapor of the solution in the cell, as the screw which secures the positive post to the cap passes entirely through the cap, and is directly exposed to the action of the acid vapor, which connection, although weak at first, becomes gradually strengthened, until finally the main current is materially weakened or entirely interrupted, and the battery is continuously more or less fouled. This objection I entirely obviate, and at the same time provide secure and convenient attachment of the several members by the following construction:

The cell or bottle A of the battery is closed at top by a cap, B, of hard rubber or other similar non-conducting material, connected, in manner presently to be described, to a sheet-metal collar, C, cemented to the neck of the cell A. A metallic bridge-piece, D, is secured to the lower side of the cap B by a screw, $d$, which passes through the cap, and serves to attach the post E' of the negative wire of the battery to the upper side of the cap B.

A central opening is formed in the bridge-piece D, within which fits a downwardly-projecting hub or boss, $b$, formed upon the lower side of the cap, and the bridge-piece is turned downward at each side, so as to provide vertical supporting-arms $d^1\ d^1$, to which are cemented or soldered the carbon plates D' D' of the battery. A central socket, F, is screwed into the hub $b$ of the cap, within which socket plays a rod, $F^2$, having the zinc plate $F^1$ soldered to its lower end. A helical spring, $f^2$, encircles the rod $F^2$, and bears against the top of the socket F, and against a collar on the upper end of the rod, and by its tension holds the zinc plate at a point above the level of the liquid in the cell, except when it is desired to induce the current, which is done by depressing the rod by pressure upon its top.

The post E of the positive wire of the battery is secured to the cap B by a screw, $e$, the head of which rests in a recess or countersink in the top of the cap, and which passes through a plate, $e'$, which encircles the socket F of the rod $F^2$, and is clamped to the cap by said socket. In order to connect the cap and the attached bridge-piece and zinc and carbon plates to the collar C of the cell B, with the capacity of ready removal and replacement, portions of the carbon supports $d^1$ of the bridge-piece D are turned up so as to form spring-catches $d^2$, which fit beneath the top flange $c$ of the collar C, and hold the cap and its attached members securely together.

Notches $c'$ are formed in the top of the flange $c$, to admit of the insertion and removal of the spring-catches, and the flange $c$ fits neatly within an annular groove formed in the bottom of the cap B. Contact of the zinc and carbon plates is prevented by two hard-rubber studs, $f^3$, which pass through and project from each side of the zinc plate $F^1$. The bridge D and the upper portions of the carbon plates D' are coated with non-conducting varnish to assist in perfecting the insulation.

It will be seen that, while the positive and negative posts are securely connected to the cap, they are perfectly insulated by the interposition of non-conducting material, and, as a consequence, the deposit due to electrical current resultant on imperfect insulation is entirely avoided, and the battery is always clean and serviceable. Moreover, the cap and its attached parts can be readily removed from and attached to the jar, and, when in position thereon, are firmly and securely held.

I claim as my invention and desire to secure by Letters Patent—

1. The combination, in a battery, of a non-conducting cap having a central hub or boss, a bridge-piece for supporting the carbon plates, secured to the lower side of said cap and fitting over said hub or boss, a screw passing through the cap and securing the bridge-piece and negative post thereto, and a positive post secured to the cap by a screw resting in a recess in the top of the cap, said screw being separated, by the non-conducting material of the cap, from the interior of the cell, and connected by a plate on the upper surface of the cap to a socket fitted within the central hub, and supporting the zinc element, substantially as and for the purpose set forth.

2. The combination, with a jar or cell, of a collar having an inwardly-projecting flange, and a bridge-piece secured to the cap, and provided with spring-catches which fit beneath the flange of the collar, substantially as and for the purpose set forth.

WM. BOEKEL.

Witnesses:
    J. SNOWDEN BELL,
    E. HILTEBRAND.